United States Patent

Hasegawa et al.

[11] Patent Number: 5,311,910
[45] Date of Patent: May 17, 1994

[54] CAP ATTACHMENT STRUCTURE FOR ACCUMULATOR

[75] Inventors: Tadashi Hasegawa; Masanobu Miyazaki; Haruya Oka, all of Saitama, Japan

[73] Assignee: Kabushiki Kaisha Showa Seisakusho, Gyoda, Japan

[21] Appl. No.: 838,497

[22] Filed: Feb. 19, 1992

[30] Foreign Application Priority Data

Feb. 20, 1991 [JP] Japan .............................. 3-014289[U]
Feb. 20, 1991 [JP] Japan .............................. 3-014291[U]

[51] Int. Cl.[5] .................................. F16L 55/04
[52] U.S. Cl. .................................. 138/31; 138/96 R; 138/30
[58] Field of Search ............... 138/30, 31, 89.3, 96 R

[56] References Cited

U.S. PATENT DOCUMENTS

| | | | |
|---|---|---|---|
| 1,932,666 | 10/1933 | Hyatt | 138/31 |
| 2,748,801 | 6/1956 | McCuistion | 138/31 |
| 3,138,303 | 6/1964 | Hoveland | 138/31 |
| 3,494,378 | 2/1970 | Greer . | |
| 4,174,656 | 11/1979 | Duffey | 138/31 |
| 4,521,164 | 6/1985 | Tuckey | 138/31 |
| 4,577,663 | 3/1986 | Andersen et al. | 138/31 |
| 4,595,038 | 6/1986 | Wege | 138/31 |
| 4,793,381 | 12/1988 | Sugimura . | |
| 4,903,734 | 2/1990 | Merklein et al. | 138/31 |
| 4,953,591 | 9/1990 | Takagi et al. | 138/31 |
| 5,031,664 | 7/1991 | Alaze | 138/31 |

FOREIGN PATENT DOCUMENTS 48-30929 9/1973 Japan .

Primary Examiner—Harvey C. Hornsby
Assistant Examiner—James F. Hook
Attorney, Agent, or Firm—Rosen, Dainow & Jacobs

[57] ABSTRACT

A piston-type accumulator has a cylindrical outer case, a piston slidably fitted in the cylindrical outer case, and a cap mounted in an open end of the outer case. The piston-type accumulator includes a cap attachment structure in which said cap has two larger- and smaller-diameter steps on an outer circumferential surface. The cylindrical outer case is deformed by staking on said larger- and smaller-diameter steps. The piston has an annular recess defined in an outer circumferential surface thereof axially between two seals thereon. The annular recess communicates with the atmosphere through a collapsible tube.

9 Claims, 4 Drawing Sheets

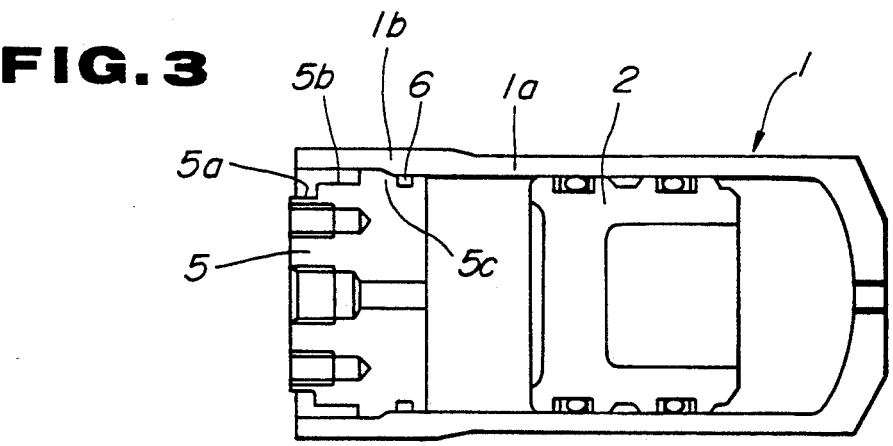
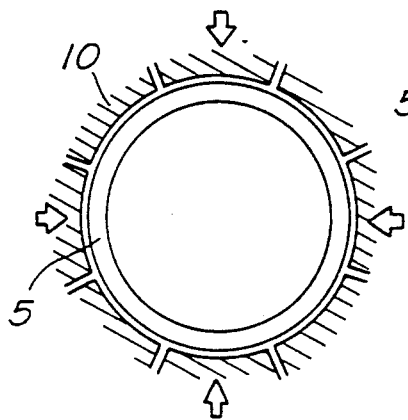
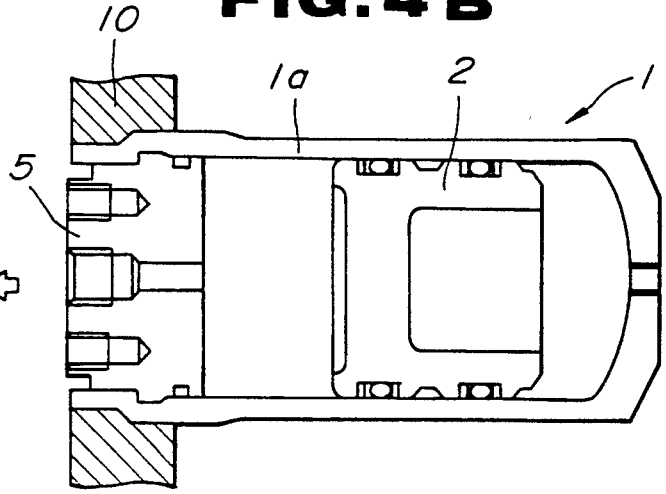
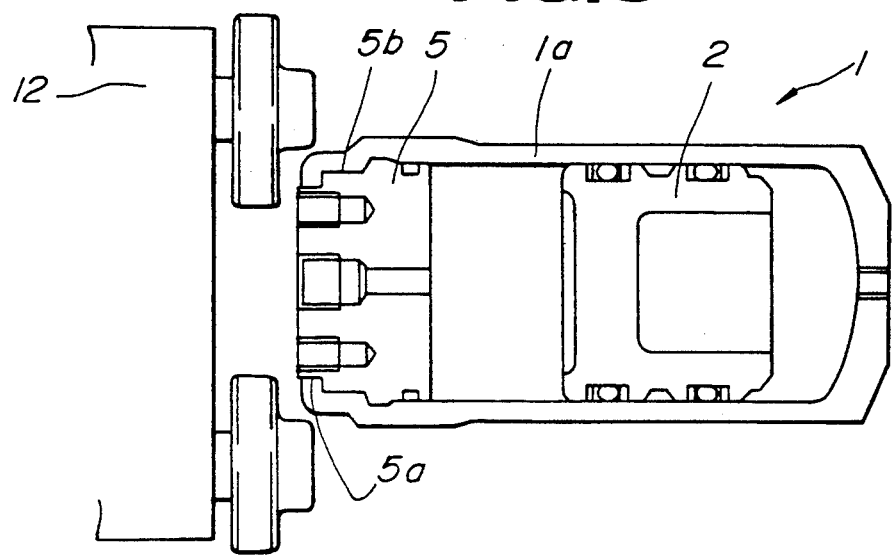

CAP ATTACHMENT STRUCTURE FOR ACCUMULATOR

BACKGROUND OF THE INVENTION

1. Field of the Invention

The present invention relates to a cap attachment structure for an accumulator of the type having a piston slidably fitted in an outer case.

2. Description of the Relevant Art

Accumulators are widely used as energy sources in a variety of fluid pressure operated devices. The accumulators are largely classified into bladder-type accumulators and piston-type accumulators.

Japanese Patent Publication No. 48-30929 published Sep. 25, 1973 discloses a piston-type accumulator. The disclosed piston-type accumulator comprises a cylindrical accumulator casing and a piston slidably fitted therein, the piston dividing the interior space of the cylindrical accumulator casing into a gas chamber and a working fluid chamber. Caps are fitted and threaded over the respective opposite ends of the cylindrical accumulator casing.

U.S. Pat. Nos. 3,494,378 and 4,793,381 show bladder-type accumulators. According to the former U.S. patent, a cap on the fluid chamber side is either welded to or staked on and welded to an end of an accumulator casing. According to the latter U.S. patent, caps are inserted and threaded in respective opposite ends of an accumulator casing.

With the accumulator disclosed in the Japanese Patent Publication No. 48-30929, the caps may possibly be loosened or dislodged due to vibration or the like either after the accumulator components are manufactured and before the accumulator is assembled or after the accumulator is assembled. The same problem arises with the accumulator disclosed in U.S. Pat. No. 4,793,381.

The caps are prevented from being loosened or detached if they are welded as disclosed in U.S. Pat. No. 3,494,378. However, the heat generated when the caps are welded to the accumulator casing is liable to adversely affect rubber components of the accumulator, such as packings, seals, or the like. The process of manufacturing the disclosed accumulator is complex because the caps are required to be cooled when welded.

The accumulator casing of the piston-type accumulator tends to be broken if a large pressure buildup is developed in the accumulator casing. This also holds true for the accumulators shown in the above U.S. patents. Another problem with the piston-type accumulator is that the piston may pop out of the casing under unduly high pressure before or at the same time the accumulator casing is broken.

The present invention has been made in an effort to effectively solve the aforesaid problems of the conventional accumulators.

SUMMARY OF THE INVENTION

It is an object of the present invention to provide a piston-type accumulator which has caps that are prevented from being loosened or detached either after the accumulator components are manufactured and before the accumulator is assembled or after the accumulator is assembled, and which has an accumulator casing prevented from being broken and a piston prevented from popping out in the event of an unduly high pressure buildup developed in the accumulator casing.

To achieve the above object, there is provided in accordance with the present invention a cap attachment structure in a piston-type accumulator having a cylindrical outer case, a piston slidably fitted in the cylindrical outer case, and a cap mounted in an open end of the outer case, characterized in that said cap has two larger- and smaller-diameter steps on an outer circumferential surface, the cylindrical outer case being deformed by staking on the larger- and smaller-diameter steps of the cap fitted in the open end of the outer case.

The above and further objects, details and advantages of the present invention will become apparent from the following detailed description of preferred embodiments thereof, when read in conjunction with the accompanying drawings.

BRIEF DESCRIPTION OF THE DRAWINGS

FIGS. 3, 4A and 4B, and 5 are views showing a procedure for assembling the accumulator shown in FIG. 1;

DETAILED DESCRIPTION OF THE PREFERRED EMBODIMENTS

Figure 1:
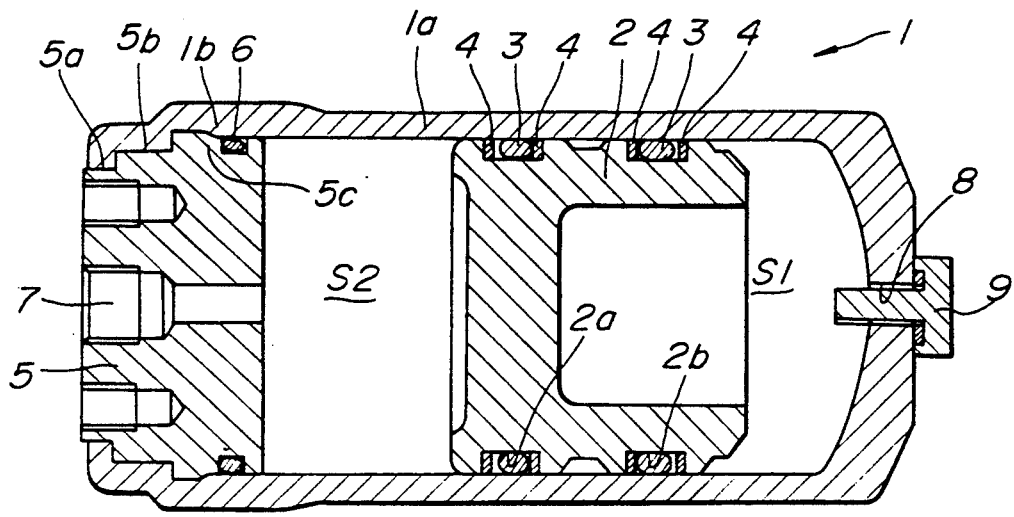
FIG. 1 is a longitudinal cross-sectional view of a piston-type accumulator according to a first embodiment of the present invention.

FIG. 1 shows a piston-type accumulator, generally designated by the reference numeral 1, according to a first embodiment of the present invention.

The piston-type accumulator 1 comprises a bottomed cylindrical outer case 1a and a piston 2 slidably fitted in the outer case 1a and dividing the interior space thereof into a gas chamber S1 and a working fluid chamber The piston 2 has two axially spaced annular grooves 2a, 2b defined in an outer circumferential surface thereof. An O-ring 3 and two backup rings 4 disposed one on each side of the O-ring 3 are disposed in each of the annular grooves 2a, 2b. The outer case 1a has an open end with a cap 5 fitted therein. The cap 5 has a smaller-diameter step 5a at an end thereof and a larger-diameter step 5b next to the smaller-diameter step 5a. The circumferential end wall of the open end of the outer case 1a is radially inwardly deformed into gripping engagement with the smaller- and larger-diameter steps 5a, 5b, thus securely holding the cap 5 in the open end of the outer case 1a. Specifically, the portion of the circumferential end wall of the open end of the outer case 1a which corresponds to the larger-diameter step 5b is radially inwardly compressed by staking so that it firmly grips the larger-diameter step 5b, and the portion of the circumferential end wall of the open end of the outer case 1a which corresponds to the smaller-diameter step 5b is radially inwardly bent by staking so that it firmly presses the smaller-diameter step 5a.

An O-ring 6 is fitted over an inner portion of the cap 5 which is axially spaced from the smaller- and larger-diameter steps 5a, 5b. The cap 5 also has an axial oil hole 7 defined therethrough for communication with a suitable fluid pressure operated system (not shown). The fluid pressure operated system may, for example, comprise an anti-lock brake system (ABS) for controlling braking forces that are applied when an automobile is braked, preventing braked tires from being locked for thereby allowing the automobile to be steered while being braked at the same time.

The gas chamber S1 is filled with a nitrogen gas under pressure that has been introduced through an inlet hole 8 defined in the bottom of the outer case 1a. After the gas chamber S1 is filled with the nitrogen gas, the inlet hole 8 is closed by a plug bolt 9. The working fluid chamber S2 is filled with a working oil.

Figure 2:
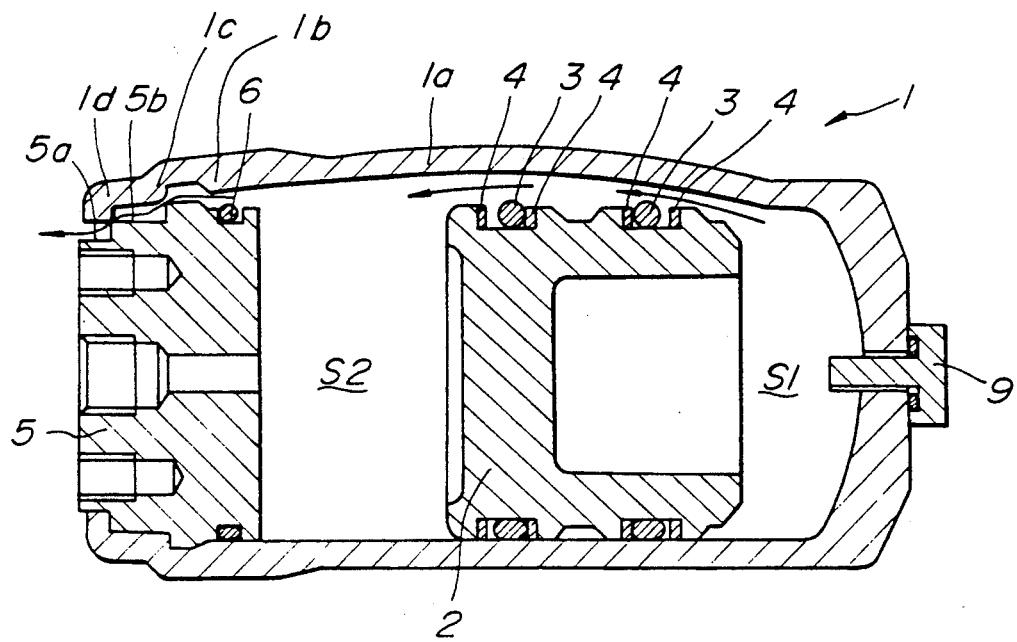
FIG. 2 is a longitudinal cross-sectional view showing an abnormal condition of the piston-type accumulator shown in FIG. 1.
Figure 6:
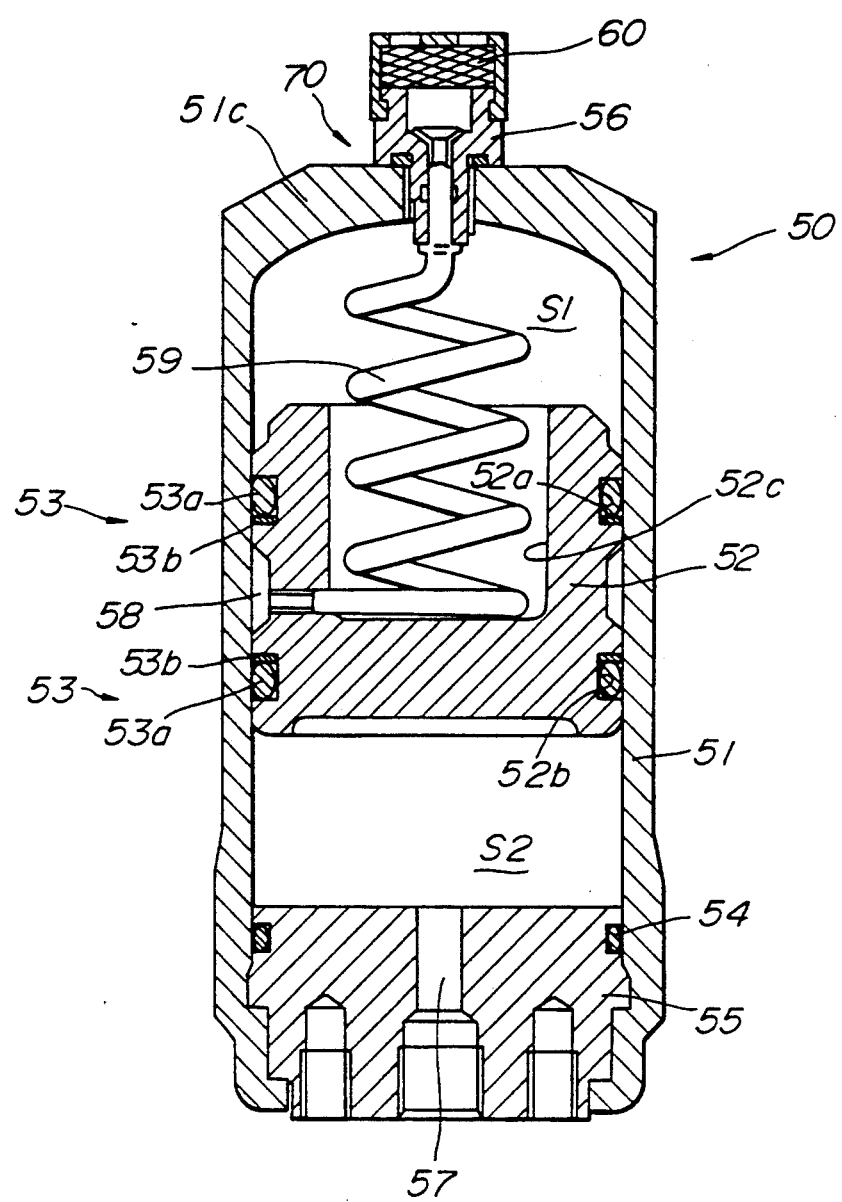
FIG. 6 is a longitudinal cross-sectional view of a piston-type accumulator according to a second embodiment of the present invention.

When an unduly high pressure is developed in the gas chamber S1 in the outer case 1a, a mechanically weakest region of the outer case 1a is radially outwardly deflected as shown in FIG. 2. The inner circumferential surface of the cylindrical wall of the outer case 1a is spaced from the O-rings 3, permitting the nitrogen gas to flow from the gas chamber S1 into the working fluid chamber S2 while by-passing the piston 2. With the outer case 1a being radially outwardly deflected into a drum shape, the staked or deformed portion of the outer case 1a which corresponds to the larger-diameter portion 5b, i.e., a bent portion 1c, increases its diameter, and disengages from the outer circumferential surface of the cap 5. At this time, the staked or deformed portion of the outer case 1a which corresponds to the smaller-diameter portion 5a, i.e., a bent portion 1d, reduces its diameter, and only partly disengages from the cap 5, allowing the nitrogen gas to flow out of the outer case 1a as indicated by the arrow. Since the staked portion of the outer case 1a is prevented from disengaging, in its entirety, from the smaller-diameter step 5a of the cap 5, the cap 5 is not detached from the outer case 1a, and the piston 2 is prevented from popping out of the outer case 1a.

The accumulator is assembled as shown in FIGS. 3 through 5. As shown in FIG. 3, the piston 2 and the cap 5 are successively fitted into the outer case 1a. A tapered outer circumferential surface 5c of the cap 5, whose diameter is progressively reduced toward the O-ring 6, is intimately held against a tapered inner circumferential surface 1b of the case 1a, whose diameter is progressively increased toward the bent portions 1c, 1d of the outer case 1a.

Then, as shown in FIGS. 4A and 4B, the portion of the outer case 1a near its outer end which corresponds to the larger diameter step 5b is radially inwardly deformed by lateral staking members 10 that are forced radially inwardly (see FIG. 4A). Thereafter, as shown in FIG. 5, the portion of the outer case 1a adjacent its outer end which corresponds to the smaller diameter step 5a is radially inwardly bent by a rolling staking machine 12. The portion of the outer case 1a that is radially inwardly deformed by the lateral staking members 10 is increased in its diameter and provides a sufficiently large tensile strength. The portion of the outer case 1b that is radially inwardly bent by the rolling staking machine 12 is sufficiently reduced in diameter though its thickness is also reduced.

The cap 5 is fixedly held in position in the outer case 1a by the above two-stage staking process. Therefore, the cap 5 is prevented from being loosened or detached from the outer case 1a due to vibration or the like after the accumulator components are manufactured and before the accumulator 1 is assembled or after the accumulator 1 is assembled.

Furthermore, even in the event of the radially outward deflection of the outer case 1a due to an unduly high pressure buildup in the outer case 1a, the staked portions 1c, 1d are not dislodged from the cap 5. Consequently, the outer case 1a is protected against destruction, and the cap 5 is prevented from being detached from the outer case 1a and hence the piston 2 will not pop out of the outer case 1a.

Since no components of the accumulator 1 are welded when the accumulator 1 is assembled, the O-rings 3 and other thermally weak components are prevented from being thermally adversely affected, and the accumulator 1 can easily be assembled.

FIGS. 6 through 9 show a piston-type accumulator 50 according to a fifth embodiment of the present invention. The piston-type accumulator 50 differs from the accumulator 1 shown in FIGS. 1 through 5 in that it additionally has a gas bleeder structure 70.

The piston-type accumulator 50 comprises a bottomed cylindrical outer case 51 and a piston 52 slidably fitted in the outer case 51 and dividing the interior space thereof into a gas chamber S1 and a working fluid chamber S2.

The piston 52 has two axially spaced annular grooves 52a, 52b defined in an outer circumferential surface thereof. Seals 53 each comprising an O-ring 53a and a backup ring 53b are disposed respectively in the annular grooves 52a, 52b. The piston 52 has a recess 52c defined in one end thereof and opening into the gas chamber S1. The outer case 51 has an open end with a cap 55 fitted therein, the cap 55 having an oil hole 57 defined axially therethrough. An O-ring 54 is fitted over an inner portion of the cap 55. The gas chamber S1 is filled with a nitrogen gas under pressure that has been introduced through an inlet hole 51a defined in the bottom 51c of the outer case 51. After the gas chamber S1 is filled with the nitrogen gas, the inlet hole 51a is closed by a plug bolt 56. The working fluid chamber S2 is filled with a working oil.

The piston 52 has an annular recess 58 defined in its outer circumferential surface axially between the seals 53. An axially collapsible, or extensible and contractable, spiral tube 59 disposed in the gas chamber S1 has an end fixed to the piston 52 and opening into the annular recess 58. The other end of the spiral tube 59 is joined to and extends through the plug bolt 56, and is open in a chamber defined in the plug bolt 56. The spiral tube 59 provides communication between the annular recess 58 and the atmosphere through the plug bolt 56 on the end of the gas chamber S1, which is a side chamber in the outer case 51 in the direction of the stroke of the piston 52. A filter 60 is attached to the plug bolt 56 in covering relationship to the chamber thereof. The annular recess 58, the spiral tube 59, the plug bolt 56, and the filter 60 jointly serve as a gas bleeder structure 70.

In operation, a working fluid is supplied under pressure from a pump (not shown) through the oil hole 57 into the working fluid chamber S2. When the fluid pressure in the working fluid chamber S2 and the gas pressure in the gas chamber S1 are in equilibrium, the oil hole 57 is operatively closed by a solenoid operated valve (not shown). When a fluid pressure operated system (not shown) connected to the accumulator 50 is to be actuated requiring a working fluid under pressure, the solenoid-operated valve is actuated to discharge the working fluid from the working fluid chamber S2 through the oil hole 57. Thereafter, a working fluid is stored under pressure in the accumulator 50 for actuating the system.

If the gas stored in the gas chamber S1 happens to pass through the inner circumferential surface of the outer case 51 and the outer circumferential surface of the piston 52 for some reason, the leaked gas enters the annular recess 58 and is then drained from the annular recess 58 through the spiral tube 59 into the atmosphere Therefore, the leaked gas does not find its way into the working fluid chamber S2. Since the spiral tube 59 is axially collapsible, it does not adversely affect the operation of the piston 52.

Figure 7:
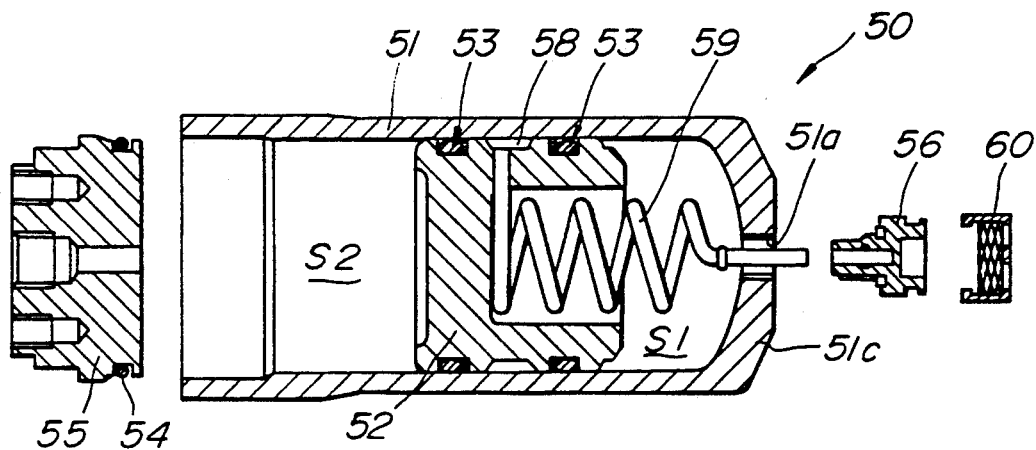
FIGS. 7 through 9 are views showing a procedure for assembling the accumulator shown in FIG. 6.
Figure 8:
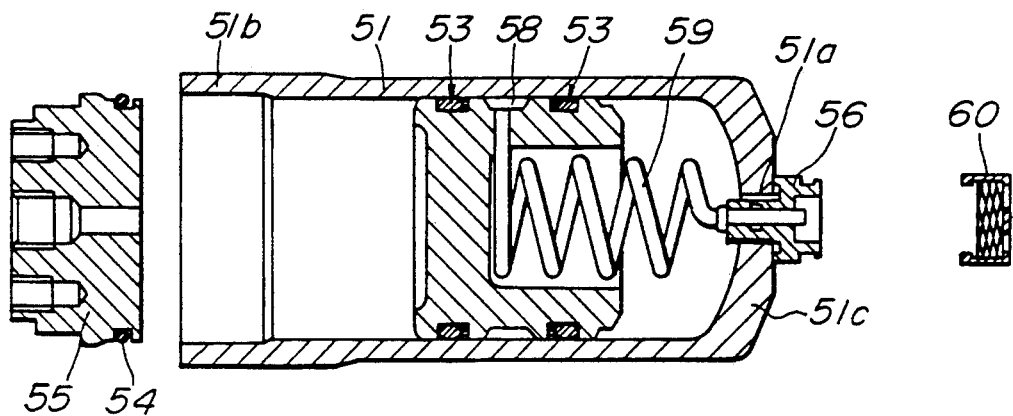
Figure 9:
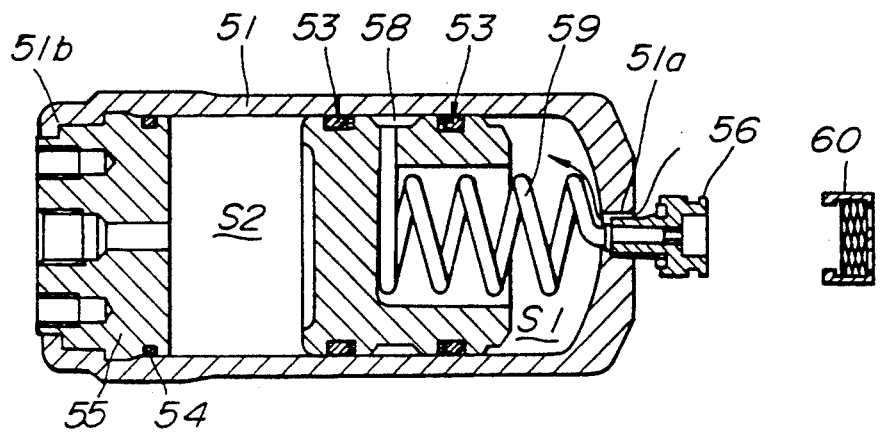

The accumulator 50 is assembled as shown in FIGS. 7 through 9.

As shown in FIG. 7, an end of the spiral tube 59 is welded to the piston 52, and the piston 52 with the seals 53 fitted thereover is inserted into the outer case 51. The other end of the spiral tube 59 is drawn out of the outer case 51 through the inlet hole 51a in the bottom 51c of the outer case 51. Thereafter, as shown in FIG. 8, the plug bolt 56 is threaded into the inlet hole 51a, and the end of the spiral tube 59 is inserted into the plug bolt 56. As shown in FIG. 9, the projected end of the spiral tube 59 is spread apart and rotatably attached to the plug bolt 56. Then, the cap 55 is fitted in the open end of the outer case 51, and an end 51b of the outer case 51 is bent radially inwardly by staking into firmly engagement with the cap 55. The plug bolt 56 is loosened, and a gas is introduced through the inlet hole 51a into the gas chamber S1. The plug bolt 56 is tightened again, and the filter 60 is attached to the plug bolt 56. Since the end of the spiral tube 59 is rotatable with respect to the plug bolt 56, the spiral tube 59 is not twisted when the plug bolt 56 is threaded in the bottom 51c of the outer case 51.

The gas bleeder structure 70 is effective to trap any gas leaked from the gas chamber S1 in the annular recess 58, and guide the gas from the annular recess 58 through the spiral tube 59 into the atmosphere. Therefore, no gas is admitted to the working fluid chamber S2. The system, such as an anti lock brake system (ABS), to which the accumulator is operatively connected, is actuated, the system exhibits improved performance without a response delay. The gas bleeder structure 70 installed in the accumulator 50 does not increase the longitudinal dimension of the accumulator 50. Therefore, the longitudinal dimension of the accumulator 50 remains substantially the same as the longitudinal dimension of the accumulator 1 shown in FIG. 1.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

We claim:

1. A cap attachment structure in a piston-type accumulator having a cylindrical outer case, a piston slidably fitted in the cylindrical outer case, a piston slidably fitted in the cylindrical outer case, and a cap mounted in an open end of the outer case, said cap having first and second opposite ends with said first end within said outer case and said second end external of said outer case, said cap having a periphery with first, second and third annular steps arranged, in that order, between said second and first ends, said first step having a diameter less than said second step and said second step having a diameter less than said third step, said cylindrical outer case being deformed by staking of said open end of the outer case onto said first and second steps of said cap wherein said cylindrical outer case has a first inwardly bent portion radially inwardly deformed on said second step of said cap and a second inwardly bent portion radially inwardly bent on said first step of said cap.

2. A cap attachment structure according to claim 1, further including axially spaced seals mounted on an outer circumferential surface of said piston, said piston having an annular recess defined in the outer circumferential surface thereof axially between said seals, and a collapsible tube disposed in said outer case, said outer case having a side chamber defined therein near an end in the direction of a stroke of said piston, said tube having an end opening into said annular recess and an opposite end opening into the atmosphere through said end of the outer case near said side chamber.

3. A cap attachment structure according to claim 2, further including a plug bolt mounted on said end of said outer case, said opposite end of the tube being rotatably attached to said plug bolt.

4. An accumulator comprising:
   a substantially cylindrical outer case;
   a piston slidably fitted in said outer case and dividing the interior space of said outer case into gas and working fluid chambers; and
   a cap mounted on an end of said outer case in closing relationship thereto near said working fluid chamber, said cap having a first end toward said working fluid chamber and a second end away from said working fluid chamber;
   said cap having a periphery with a first tapered portion and a first step closer to said second end of said cap than said first tapered portion;
   said outer case having a second tapered portion and a first bent portion which are intimately held against said first tapered portion and said first step, respectively.

5. An accumulator according to claim 4, wherein said cap has a second step closer to said second end of the cap than said first step and a smaller diameter than said first step, said outer case having a second bent portion intimately held against said second step.

6. An accumulator according to claim 5, wherein first and second bent portions of said outer case are deformed by staking.

7. An accumulator according to claim 4, wherein said piston has a recess defined therein and opening into said gas chamber and an annular recess defined in an outer circumferential surface thereof, further including a collapsible tube disposed in said gas chamber, said tube having an end opening into said annular recess and an opposite end opening into the atmosphere through said recess, said gas chamber, and an end of the outer case near said gas chamber.

8. An accumulator having a cylindrical casing with an open end, a piston slidably positioned in said casing, and a cap fitted into said open end, said cap having an annular peripheral surface extending between first and second ends of said cap, said second end being within said casing, said peripheral surface having a first step of a first diameter and a second step of a second diameter larger than said first diameter, said first step being closer to said first end of said cap than said second step, said casing having an inner annular surface with a first portion bent toward said first step and a second portion bent to intimately engage said second step, and further comprising a seal between said cap and inner surface of said casing, said seal being closer to said second end of said cap than said second step, said first step having a diameter to inhibit separation of said cap from said casing in response to opening of said seal as a result of deformation of said casing resulting from internal pressure in said casing.

9. The accumulator of claim 8 wherein said peripheral surface further has a third step between said second step and seal, said third step having a diameter greater than that of said second step and tapering radially inwardly toward said second end of said cap, the inner surface of said cap having a tapered surface engaging said third step.

* * * * *